C. D. TISDALE.
ELECTRIC-RAILROAD CAR SIGNALS.

No. 183,874.                 Patented Oct. 31, 1876.

Witnesses
S. W. Piper
L. W. Miller

Charles D. Tisdale
by his attorney
R. H. Eddy

THE GRAPHIC CO. N.Y.

UNITED STATES PATENT OFFICE.

CHARLES D. TISDALE, OF BOSTON, MASSACHUSETTS.

IMPROVEMENT IN ELECTRIC RAILROAD-CAR SIGNALS.

Specification forming part of Letters Patent No. 183,874, dated October 31, 1876; application filed April 13, 1876.

*To all whom it may concern:*

Be it known that I, CHARLES D. TISDALE, of Boston, of the county of Suffolk and State of Massachusetts, have made a new and useful invention for enabling separate trains or carriages of a railway to have telegraphic communication with one another while at rest or in motion on the railway; and I do hereby declare the same to be fully described in the following specification, and represented in the accompanying drawings, of which—

Figure 1:
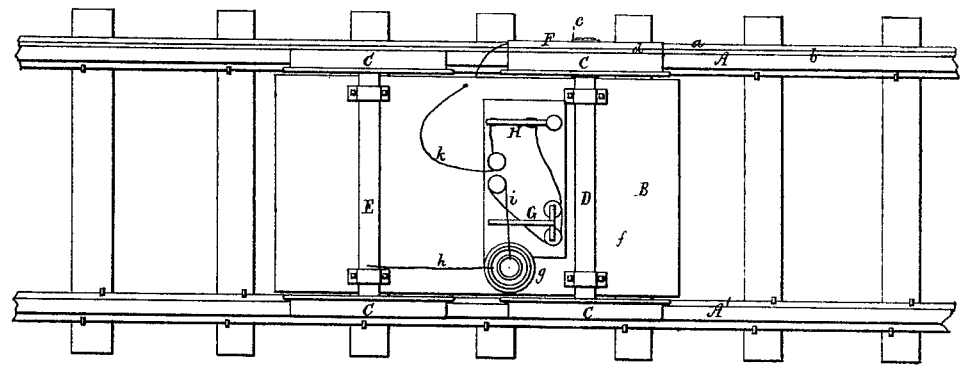
Figure 2:
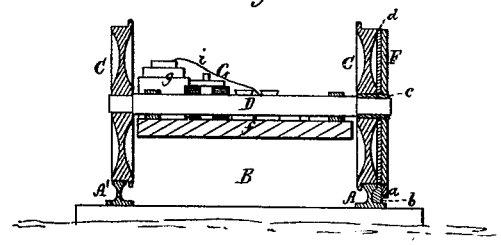

Figure 1 denotes a top view of a railway and car provided with my invention. Fig. 2 is a transverse section thereof, taken through the wheel-axle furnished with the compound wheel, to be hereinafter described.

In such drawings, A A' represent the two line-rails of a railway, the first one, A, having fastened to one side of it another and smaller rail or bar, a, with its upper surface flush or even with that of the rail A. The auxiliary rail a is electrically insulated from the rail A by a strip, b, of wood or some other proper non-conductor of electricity arranged between them, as shown. The two rails A a are to be so secured together as to be electrically insulated from each other—they, with their insulators, constituting what I term a "compound rail." The railway carriage or truck (shown at B as provided with four wheels, C, fixed upon two axles, D E) is to run on the rails A A'. On the axle D, and alongside of one wheel, C, thereof, is fixed an auxiliary metallic wheel, F, which is to touch and run upon the auxiliary rail a. This auxiliary wheel should be electrically insulated from the wheel C and the axle D, the insulators being a sleeve, c, fitted on the axle, and a disk, d, interposed between the wheels F and C, such sleeve and such disk being made of a material which is a non-conductor of electricity. The wheel composed of the two wheels F and C and their insulator d I term the "compound wheel." On the platform f, or in some other proper part of the carriage, there is fixed a galvanic battery, g, and an electro-magnetic telegraphic instrument, G, and key H. One wire, h, from the battery, is put in electric connection with one of the axles. The other or coil wire i of the magnet connects with the battery and the key. A third wire, k, leads from the key-anvil, and is put in electrical connection with the auxiliary wheel F, or touches it while it may be either at rest or revolving.

If, now, we suppose there be upon the railway-track another train or car provided with an auxiliary wheel, a telegraphic apparatus, circuit-wires, and battery, all as hereinbefore specified, the two carriages can readily be put in telegraphic communication with each other.

I am aware that, for effecting telegraphic communication between the trains of a railway, a wire or system of wires, separate from the rails, have been used, and to operate with brushes or arms extended from the trains. I therefore do not claim such.

My invention involves the compound wheel of the car and the compound rail of the track, all as hereinbefore described. Therefore

I claim—

1. In combination with a railway, A A', and a car, B, thereof, the additional rail a, secured to and electrically insulated from one of the track-rails, and the auxiliary wheel F, fixed on one of the axles, aside of one of its wheels, and electrically insulated from both wheel and axle, all as set forth.

2. The compound rail, substantially as described, consisting of the main rail A and the auxiliary rail a, arranged, connected, and electrically insulated from each other, essentially as specified.

3. The compound wheel, substantially as described, composed of the main-track wheel C, the auxiliary wheel F, and the insulating-disk d, connected and arranged as specified.

4. In combination with the axle D and its wheels C C of a railway-carriage, the additional wheel F, arranged on the said axle and aside of one of the wheels thereof, and electrically insulated from said wheel and said axle, and being, for operation with an auxiliary rail or bar, arranged with and fixed, as described, to one of the rails of a railway, as set forth.

CHAS. D. TISDALE.

Witnesses:
R. H. EDDY,
J. R. SNOW.